United States Patent
Pullen et al.

(10) Patent No.: US 6,304,011 B1
(45) Date of Patent: Oct. 16, 2001

(54) ROTARY ELECTRICAL MACHINES

(75) Inventors: Keith Robert Pullen; Arnold Fenocchi, both of London; Justin Arthur Hall, Surrey; Mohammad Reza Etemad, London, all of (GB)

(73) Assignee: The Turbo Genset Company Limited (GB)

( * ) Notice: Subject to any disclaimer, the term of this patent is extended or adjusted under 35 U.S.C. 154(b) by 0 days.

(21) Appl. No.: 09/242,183

(22) PCT Filed: Aug. 5, 1997

(86) PCT No.: PCT/GB97/02116

§ 371 Date: Jun. 21, 1999

§ 102(e) Date: Jun. 21, 1999

(87) PCT Pub. No.: WO98/07227

PCT Pub. Date: Feb. 19, 1998

(30) Foreign Application Priority Data

Aug. 9, 1996 (GB) .................................................. 9616757
Dec. 4, 1996 (GB) .................................................. 9625177

(51) Int. Cl.[7] .................................................. H02K 9/00
(52) U.S. Cl. .................................................. 310/52; 310/58
(58) Field of Search .................................................. 310/54, 52, 55, 310/58, 61, 114, 169, 261, 268, 60 A

(56) References Cited

U.S. PATENT DOCUMENTS 1,301,845 * 4/1919 Hellmund .................................................. 310/58
2,381,296 * 8/1945 Lynn .................................................. 310/63

(List continued on next page.)

FOREIGN PATENT DOCUMENTS 0361925 9/1989 (EP) .
0533359 A2 8/1992 (EP) .

(List continued on next page.)

OTHER PUBLICATIONS

E. Spooner "Torus : A slotless , toroidal stator ", Nov. 1992, pp. 497–506.*
Carrici et al. "Prototype of Innovative Wheel Direct Drive", 1996 IEEE, pp. 764–770.*
Carcchi et al. "Prototype of innovative wheel direct drive . . . ".*
Spooner et al. "Torus' a slotless toroidal stator . . . ".*

Primary Examiner—Joseph Waks
(74) Attorney, Agent, or Firm—Kaplan & Gilman, L.L.P.

(57) ABSTRACT

A rotary electrical machine which has a plurality of disc-shaped stator stages and a plurality of disc-shaped rotor stages, each of the rotor stages being respectively alternately interleaved with the stator stages. A space is provided between each stator stage and its adjacent rotor stage. Each of the stator stages is provided with at least two stator windings, defining a passage therebetween adjacent windings. A coiled pipe is disposed in or formed integrally with each of the passages in substantially the same plane as the stator stage, such that the outlet of one pipe is coupled with the inlet of the pipe disposed in the adjacent passage. In use, fluid, for example air, helium, water or oil is caused to flow around the coiled pipes in the passages between the stator windings. At the same time, cooling gas, for example, air or helium, is caused to pass through the stator-rotor spaces so as to cool the magnets, etc. and the retention hoops, etc. of the rotor stage as well as the outer surfaces of the stator stage. Alternatively, the stator-rotor spaces may be held under a vacuum.

51 Claims, 7 Drawing Sheets

U.S. PATENT DOCUMENTS

| | | | |
|---|---|---|---|
| 2,479,589 | * 8/1949 | Parker | 310/211 |
| 2,734,140 | * 2/1956 | Parker | 310/268 |
| 3,418,506 | * 12/1968 | Parker | 310/268 |
| 3,439,202 | * 4/1969 | Wanke | 310/52 |
| 3,932,778 | * 1/1976 | Watanabe et al. | 310/61 |
| 4,001,617 | * 1/1977 | Boyer | 310/52 |
| 4,059,777 | * 11/1977 | Whiteley | 310/64 |
| 4,190,780 | * 2/1980 | Whiteley | 310/59 |
| 4,207,487 | * 6/1980 | Beyersdorf | 310/268 |
| 4,286,183 | 8/1981 | Montgomery | 310/62 |
| 4,644,202 | 2/1987 | Kroy | 310/58 |
| 4,739,204 | * 4/1988 | Kitamura et al. | 310/68 D |
| 4,837,469 | * 6/1989 | Ward | 310/53 |
| 5,019,733 | * 5/1991 | Kano et al. | 310/61 |
| 5,334,898 | * 8/1994 | Skybyk | 310/268 |
| 5,581,135 | * 12/1996 | Ito et al. | 310/52 |

FOREIGN PATENT DOCUMENTS

| | | |
|---|---|---|
| 0 643 471 A1 | 9/1994 | (EP) . |
| 0135825 | 1/1920 | (GB) . |
| 0319479 | 9/1929 | (GB) . |
| 0380067 | 9/1932 | (GB) . |
| 484371 | 6/1937 | (GB) . |
| 1106989 | 3/1968 | (GB) . |
| 2222031 | 2/1990 | (GB) . |
| 2261327 | 5/1993 | (GB) . |
| 2275371 | 8/1994 | (GB) . |
| WO 94/22204 | 10/1993 | (WO) . |

* cited by examiner

ROTARY ELECTRICAL MACHINES

The present invention relates to rotary electrical machines such as electrical generators and electric motors and to a method of cooling the components of such machines.

UK Patent Specification GB-A-2 222 031 describes an axial field generator capable of operation at very high speeds. However certain features of this known design have been perceived to have some drawbacks. In response to this, our UK Patent Specification No. GB-A-2 261 327 describes and claims certain improvements in rotary electrical machines. Both of these known designs employ rotors having substantially equi-angularly spaced magnets retained by a retention ring and stators provided with respective electrical windings.

The generator described in GB-A-2 222 031 employs air cooling for the stators. The air is directed by means of radial channels entering at the rim. The channels conduct air towards the centre of the stators and back again to the rim. As a result, on the return path the air is already hot and so performs little cooling. At the same time, the multiplicity of channels detracts from the strength of the stators.

On the other hand, GB-A-2 261 327 discloses a stator comprising at least one radial channel for ducting of cooling air. The channel has an entrance at or substantially near the rim of the stator and an exit at or substantially near the centre of the stator. Also, spaces are provided between each stator and an adjacent rotor. In use, air is drawn into the stator, and is conducted through the channel from the rim to the centre. At the same time, air is conducted through the channels formed by the stator-rotor spaces, from the rim to the centre. The machine comprises a central drive shaft, having a hollow core which communicates with the radial channel and the stator-rotor spaces. The air enters the hollow core of the drive shaft after conduction through the stator and is conducted away from the stators.

The cooling arrangement described in GB-A-2 261 327 provides adequate cooling in electrical machines for many applications. However, the power or speed output of such machines is limited because the air in the stator reaches a maximum temperature above which the machine overheats.

We have now devised an arrangement which overcomes the disadvantage of the above prior art arrangements. In accordance with a first aspect of the present invention, there is provided a rotary electrical machine comprising at least one generally disc-shaped stator stage and at least one generally disc-shaped rotor stage, the electrical machine further comprising cooling means for cooling the stator by causing a liquid to pass thereover.

The liquid cooling is preferably but not necessarily supplemented by a gas cooling arrangement.

By supplementing or replacing gas cooling of a disc-type rotary electrical machine of a particular size with liquid cooling, it is possible to achieve a power or speed output which is substantially greater than the available output from known machines of the same size. However, the gas cooling may be replaced entirely if the machine is required to operate in vacuum conditions, so as to be suitable for operation as a flywheel motor-generator.

The stator stage is preferably provided with at least two stator windings defining a passage therebetween. The cooling means may then be arranged to cause cooling liquid to pass through the passage. The stator stage may be provided with three or more stator windings, a passage being provided between each. The cooling means may then be arranged to cause cooling liquid to pass through each passage.

The cooling means may comprise a pump. Furthermore, a fluid cooler may be provided which receives liquid after it has passed through the at least one radial channel, and cools the liquid. The cooled liquid can then be re-used.

The electrical machine according to the present invention preferably comprises a channel disposed in the or each passage between the stator windings for conducting the cooling liquid. The channel may comprise a separate entity, for example a pipe, or it may be formed integrally with one or both of the walls of the respective passage, for example, by means of moulding. In either case, the channel is preferably in substantially in the same plane as the stator. In one embodiment of the present invention, the channel may be coiled to form a generally disc shaped arrangement In another arrangement, the or each channel is arranged to conduct cooling liquid radially within the passage.

In either of the embodiments described above, if a plurality of passages are provided in the or each stator stage, then the outlet of a channel disposed in one passage is preferably coupled with the inlet of the channel disposed in an adjacent passage. Thus, the cooling liquid is circulated around each channel, before exiting the stator stage through the outlet of the last channel.

In a third embodiment, cooling liquid is conducted from a first position at the periphery of the passage to a second position which is substantially diametrically opposite the first position, preferably by means of a plurality of parallel channels. In this case, the channel or channels disposed in each passage preferably have a common inlet and a common outlet.

The channel preferably comprises a non-conducting or poorly electrically conducting material, so as to avoid eddy currents.

The cooling liquid may be, for example, water or oil.

The at least one rotor stage is preferably adjacent the at least one stator stage, and a space is preferably provided between them. Cooling means may provided which causes cooling gas, if required, to pass through the stator-rotor space. The electrical machine of the present invention preferably comprises at least two rotor stages, having a stator stage disposed therebetween, the rotor stages being connected together by means of a coupling arrangement. The coupling arrangement may comprise a respective set of teeth provided on or formed integrally with each rotor stage. In use, the rotor stages are coupled together by inserting a set of teeth on one of the rotor stages into the spaces between the teeth of the other rotor stage. Each tooth and each respective space is generally V-shaped, the apex each tooth and each space being flattened out. In use, when the rotor stages are connected together, the apex of the tooth does not contact the apex of the respective space, such that an air gap is provided.

Alternatively, coupling of the discs may be achieved using a spigot fit between the discs. Communication of the air through such a coupling is achieved by, drillings or slots which are substantially radial.

In a preferred embodiment, the rotary electrical machine of the present invention comprises a generally central hollow core which communicates with the stator-rotor space. In this case, cooling means may be provided which causes cooling gas to pass through the hollow core before entering the stator-rotor space. The cooling means in this case may be arranged to provide pressurised cooling air to the hollows core to blow the cooling air through the hollow core and into the stator-rotor space. Alternatively, the cooling means mast be arranged to subject the stator-rotor space to a reduced pressure to suck the cooling air through the stator-rotor space from the hollow core.

The hollow core is formed by means of a generally cylindrical housing which is mounted around a generally central drive shaft. The housing may be provided with one gas inlet, but is preferably provided with at least two gas inlets at opposite ends thereof.

More preferably, a plurality of equi-angularly spaced gas inlets are provided, at each end of the cylindrical housing defining the hollow core.

The cooling gas, if required, may be, for example, air, preferably at close to atmospheric pressure or partial vacuum to reduce windage losses. Alternatively, helium may be used, which reduces density and therefore windage of the machine.

In accordance with a second aspect of the present invention there is provided a rotary electrical machine comprising a stator stage, at least one rotor stage, a space being provided between the stator stage and the at least one rotor stage, and a generally central hollow core which communicates with said space between the stator and the rotor stage, the electrical machine further comprising first cooling means for cooling the stator stage by causing fluid to pass thereover, and second cooling means for causing cooling fluid to pass through the hollow core before entering the space between the stator and rotor stages.

Thus, the second aspect of the present invention provides an arrangement whereby the machine has two separate fluid cooling circuits: one in which cooling fluid flows through the central hollow core and the stator-rotor gap, and another in which cooling fluid flows over the stator to cool the windings.

The fluid for cooling the stator stage may be a liquid, e.g water or oil, or a gas, e.g. air or helium. The fluid flossing in the hollow core and the rotor stator gap is preferably a gas, to allow high-speed operation.

The rotary electrical machine of the second aspect of the present invention preferably comprises at least two stages, the first cooling means being arranged to cause cooling fluid to be supplied to each stator stage in parallel. The or each stator stage is preferably provided with at least two stator windings defining a passage therebetween the first cooling means causing cooling fluid to pass through the passage. The or each stator stage may be provided with three or more stator windings, a passage being provided between each adjacent winding and the first cooling means causing cooling fluid to pass through each of the passages. A channel is preferably disposed in or formed integrally with the or each passage for conducting cooling fluid, preferably in substantially the same plane as the respect stator stage.

In one embodiment of the second aspect of the present invention, the or each channel comprises a pipe which is coiled to form a generally disc-shaped arrangement and which is disposed in or formed integrally with the or each passage. The pipe may comprise a moulding of non-conducting or poorly electrically conducting material, e.g. plastic.

In another embodiment of the second aspect of the present invention, the or each channel is arranged to conduct cooling fluid radially within the passage.

In the case of both of the above embodiments, the outlet of a channel disposed in one passage may be coupled with the inlet of the channel disposed in an adjacent passage.

In other embodiment of the second aspect of the present invention, the or each channel may be arranged to conduct cooling fluid from a first position up the periphery of the passage to a second position which is substantially diametrically opposite the first position. For this purpose, a plurality of parallel channels may be arranged to conduct cooling fluid from the first position to the second position. In the case of this embodiment of the second aspect of the present invention, the channel or channels disposed in each passage preferably have a common inlet and a common outlet. As a result, any number of stator windings may be provided each defining a passage therebetween.

The rotary electrical machine in accordance with the second embodiment of the present invention may comprise at least two rotor stages connected together by means of a coupling arrangement which preferably comprises at least one air gap.

In accordance with a third aspect of the present invention there is provided a rotary electrical machine comprising a stator stage and at least one rotor stage, a space being provided between said stator stage and said at least one rotor stage, and a generally central hollows core which communicates with the space between the stator stage and the rotor stage, the electrical machine further comprising cooling means for cooling the stage by causing cooling fluid to pass thereover, the space between the stator stage and the at least one rotor stage being under a vacuum.

Embodiments of the present invention will now be explained in more detail by way of examples only and with reference to the accompanying drawings, in which.

Figure 1:
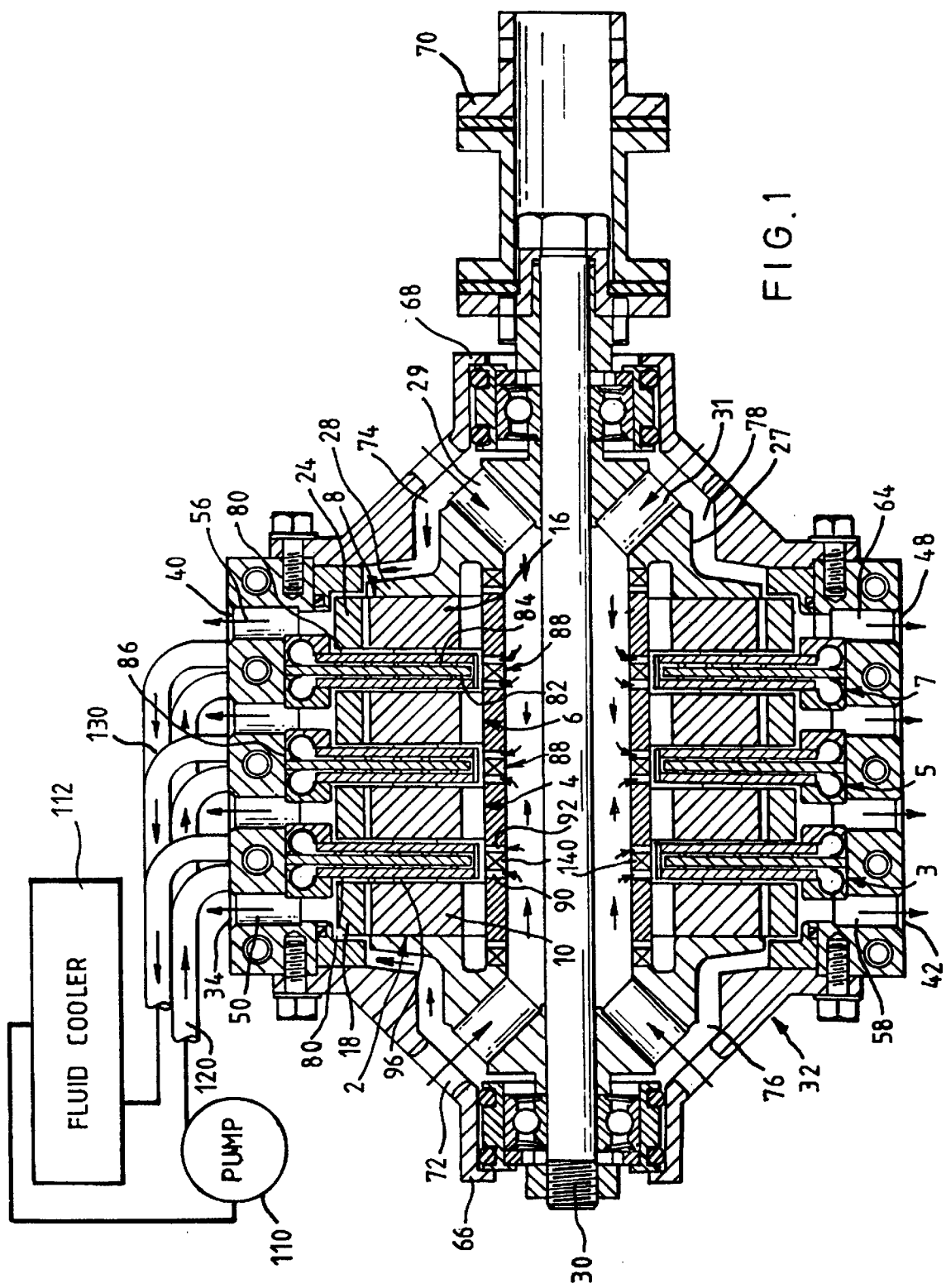
FIG. 1 shows an axial cross-section through an axial field electrical machine according to an embodiment of the present invention.
Figure 11:
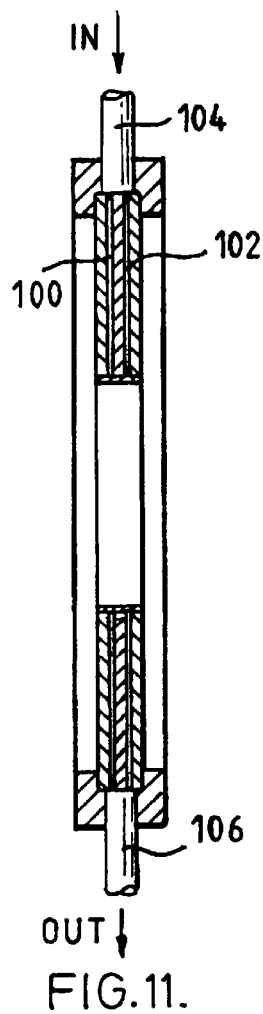
FIG. 11 shows a cross-section through a fourth embodiment of a stator for use in the axial field electrical machine shown in FIG. 1.
Figure 12A:
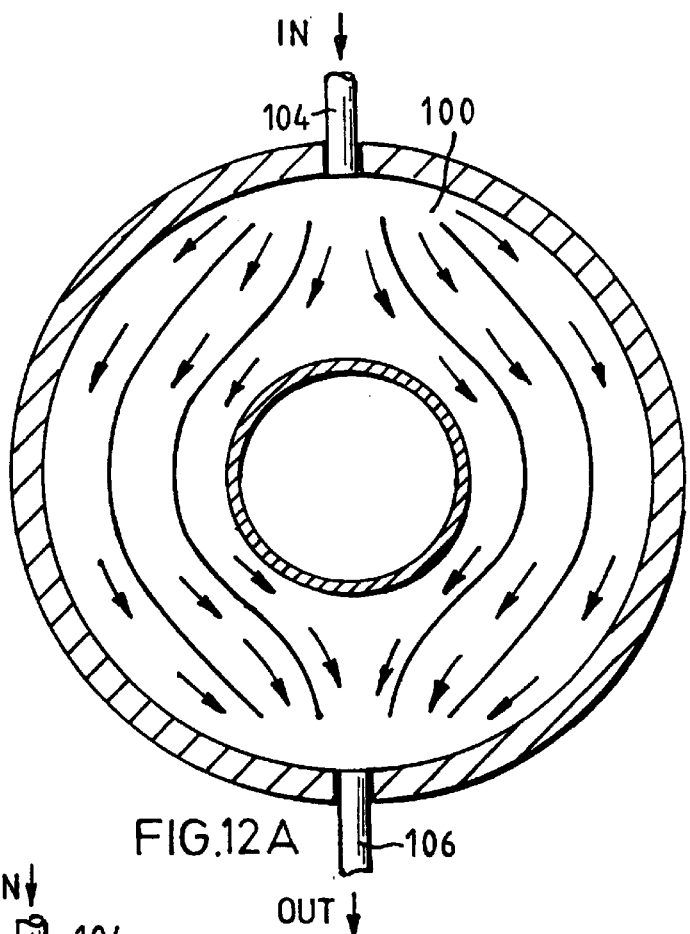
Figure 12B:
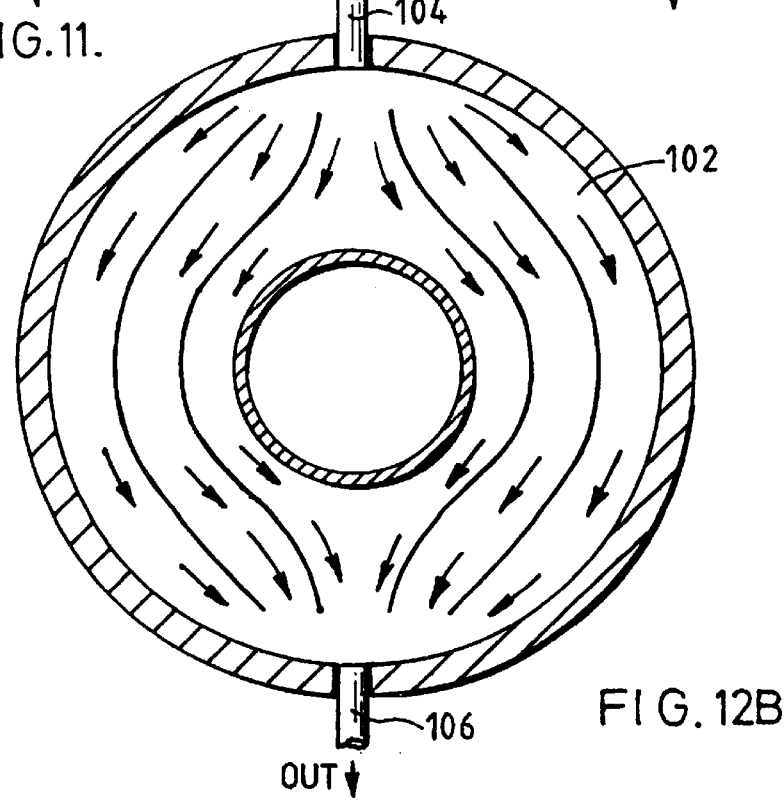
Figure 13:
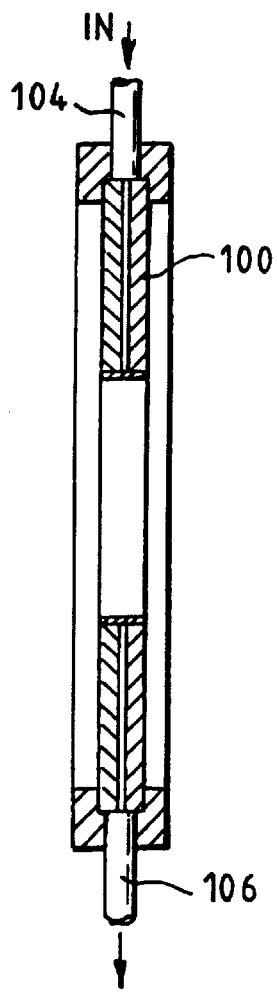
Figure 14A:
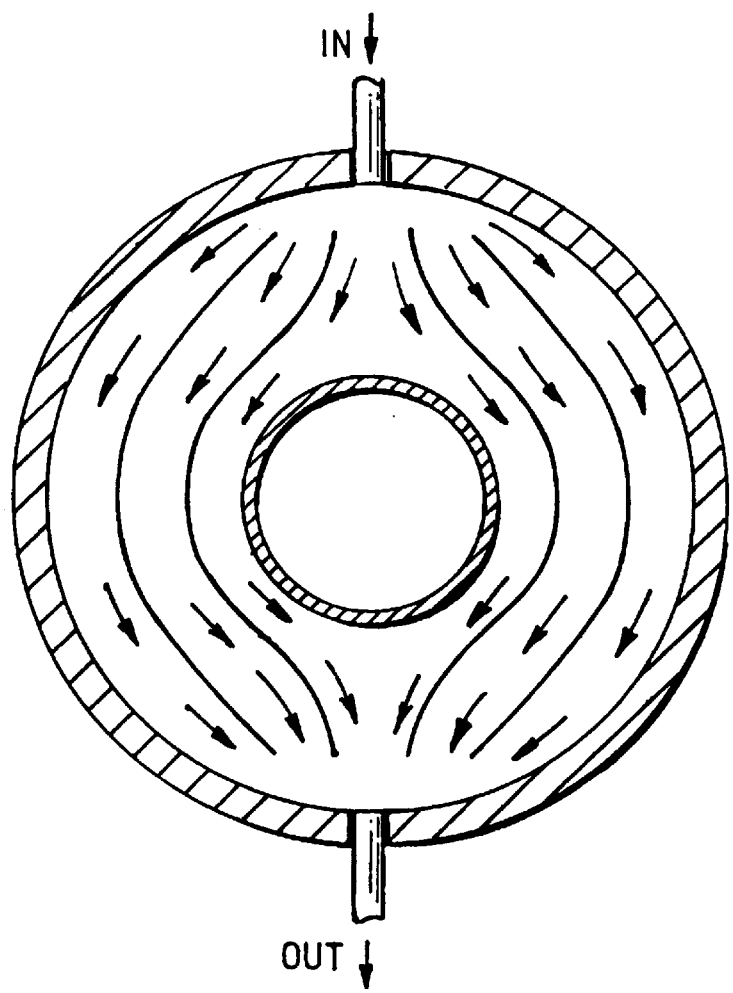

FIGS. 12A and 12B shoes cross-sections through the cooling pipes of the stator shown in FIG. 11;

FIG. 13 shows a cross-section through a fifth embodiment of a stator for use in the axial field electrical machine shown in FIG. 1; and FIG. 14A shows a cross-section through the cooling pipes of the stator shown in FIG. 13.

Referring to FIG. 1 of the drawings, an axial field electrical machine 1 according to the present invention comprises four disc-shaped rotor stages 2, 4, 6, 8 and three disc-shaped stator stages 3, 5, 7. Each of the four disc-shaped rotor stages 2, 4, 6, 8 is respectively alternately interleaved with the three disc-shaped stator stages 3, 5, 7. The rotor stages each comprise a plurality of radially spaced magnets 10–16, and the magnets are retained by respective hoops 18–24.

A closed path for the magnetic field resulting from the magnets 10–16 is maintained by keeper discs 26, 28 which are integrally formed around the ends of a generally cylindrical housing 27. Each end of the housing 27 is formed with an opening 29, 31.

The stator stages 3, 5, 7 are joined to form a unitary assembly block 32 so that each is provided with a plurality of radially arranged air holes 34–48 communicating with respective air channels 50–64.

The machine comprises a central drive shaft 30 which passes through the respective openings in the rotors 2, 4, 6 and stators 3, 7, 9 within the housing 27, and passes outwardly of the block 32 through a first casing end piece 66 and through a second casing end piece 68. The housing 27 is formed with openings 33 which communicate With an axial flow channel 37 between the housing 27 and the drive shaft 30.

The housing 27 and drive shaft 30 are mounted within the block 3 such that flow channels 72–78 are provided at each end of the machine between the block 32 and the housing 27. The channels 72–78 communicate with air channels 50, 56, 58, 64 respectively. Furthermore, the end pieces 66, 68 are formed with inlets 73–79 which communicate which communicate with the openings 33 in the housing 27 and with the flow channels 7–78.

After the drive shaft 30 emerges through the second end piece 68, it is connected to a coupling 70 for connecting to another component such as a turbine or gas turbine engine (not shown).

The construction of each stator stage is substantially the same, but for convenience, a description will be given only of the stator stage 7 which is adjacent the second end piece 68.

Figure 2:
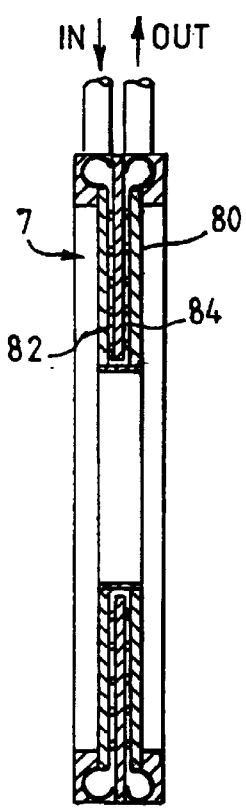
FIG. 2 shows a cross-section through a stator of the axial field electrical machine shown in FIG. 1, FIGS. 3A and 3B show cross-sections through the cooling pipes of the stator shown in FIG. 2.

Referring to FIGS. 1 and 2 of the drawings, the stator stage 7 comprises a winding assembly 80 consisting of three stator windings. A passage 82, 84 is provided between the central winding and each of the two outer windings.

At the central opening 88, the stator is provided with gaps 90, 92 which communicate with the air channels 54, 56 by means of spaces 94, 96 between the stator stage 7 and its respective rotor stages 6, 8.

Figure 4:
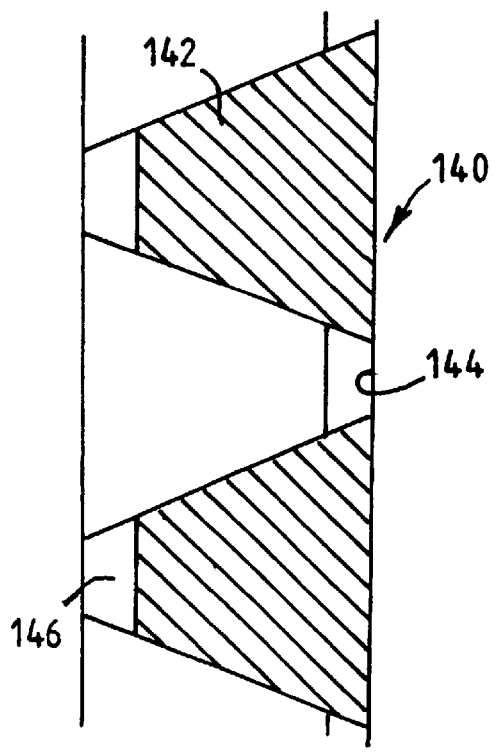
FIG. 4 shows an axial cross-section through the coupling arrangement between two rotor stages.
Figure 5:
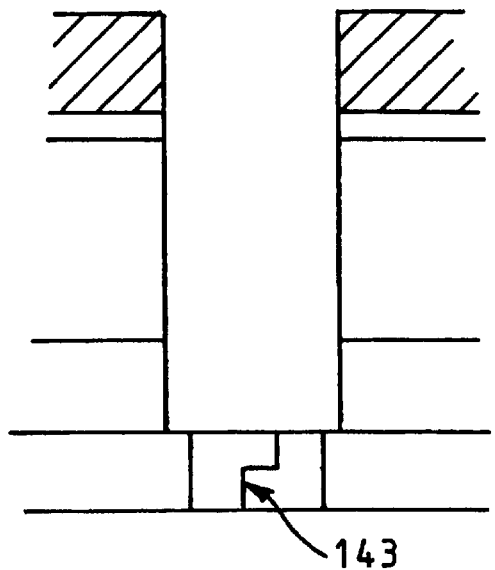
FIG. 5 shows a cross-section through an alternative coupling arrangement between two rotor stages, the stator being omitted for the sake of clarity.
Figure 6:
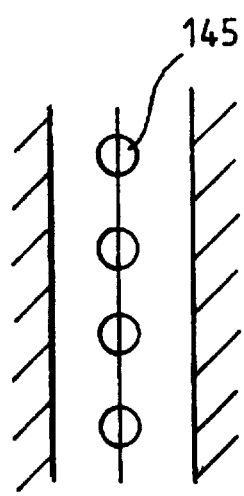
FIG. 6 shows an axial cross-section through a first embodiment of the coupling arrangement of FIG. 5.
Figure 7:
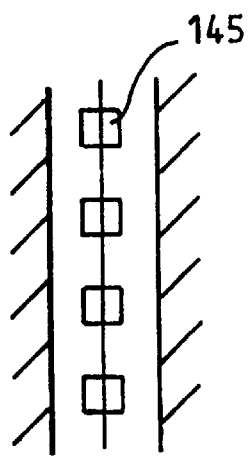
FIG. 7 shows an axial cross-section through a second embodiment of the coupling arrangement of FIG. 5.
Figure 8:
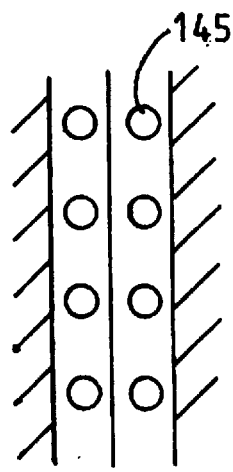
FIG. 8 shows an axial cross-section through a third embodiment of the coupling arrangement of FIG. 5.

The rotor stages are connected by means of respective coupling arrangements 140. Each rotor stage is provided with a central coupling disc having equi-angularly spaced teeth formed or mounted thereon. Referring to FIG. 4 of the drawings, the teeth 142 and the spaces 144 between them are generally V-shaped, and the rotor stages are coupled together by slotting the teeth of one rotor stage into the spaces 144 between the teeth of the other rotor stage. The apex of the teeth 142 and the spaces 144 are flattened off such that, in use, the apex of each tooth 142 falls short of the apex of the respective space 144 and provides an air gap 146 between them, the air gap communicating with the stator-rotor spaces 94, 96.

Referring to FIGS. 5 to 8 of the drawings, in an alternative embodiment, the rotor stables are coupled by means of a spigot arrangement 143 between the discs. Communication of air through such a coupling is achieved bad drillings or slots 145 which are substantially radial (see FIG. 6 to 8).

In use, the drive shaft 30 rotates, and air is drawn into the machine through the inlets 73–79 in the block 32 Air is drawn into the housing 27 through the openings 33 therein, forced along the axial channel 37 between the drive shaft 30 and the housing 27, and thence into the stator-rotor spaces 94, 96 via gaps 90, 92. The air flows into the peripheral air channels 54, 56 formed in the stator assembly block 32 and exits via the respective air holes 38, 40, as indicated by the arrows in FIG. 1 of the drawings.

At the same time, air is drawn into the flow channels 72–78 between the housing 27 and the block 32. The air then flows into the peripheral air channels 50, 56, 58, 64 in the stator assembly block 32 and exits via the respective air holes 34, 40, 42, 48, as indicated by the arrows in FIG. 1 of the drawings.

Thus, the cooling air cools the magnets and the retention hoops of the rotors, as well as the outer windings of the stator.

Figure 3A:
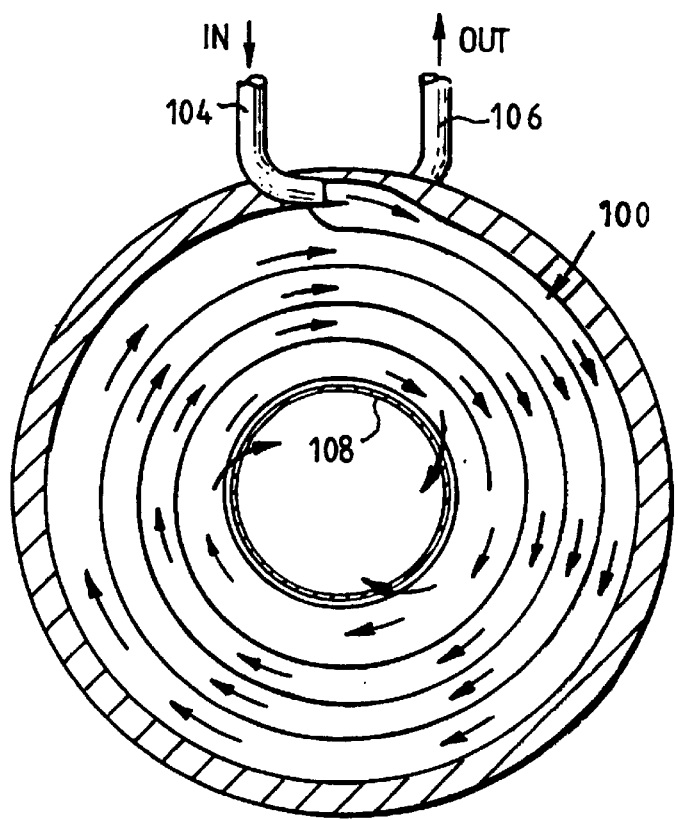
Figure 3B:
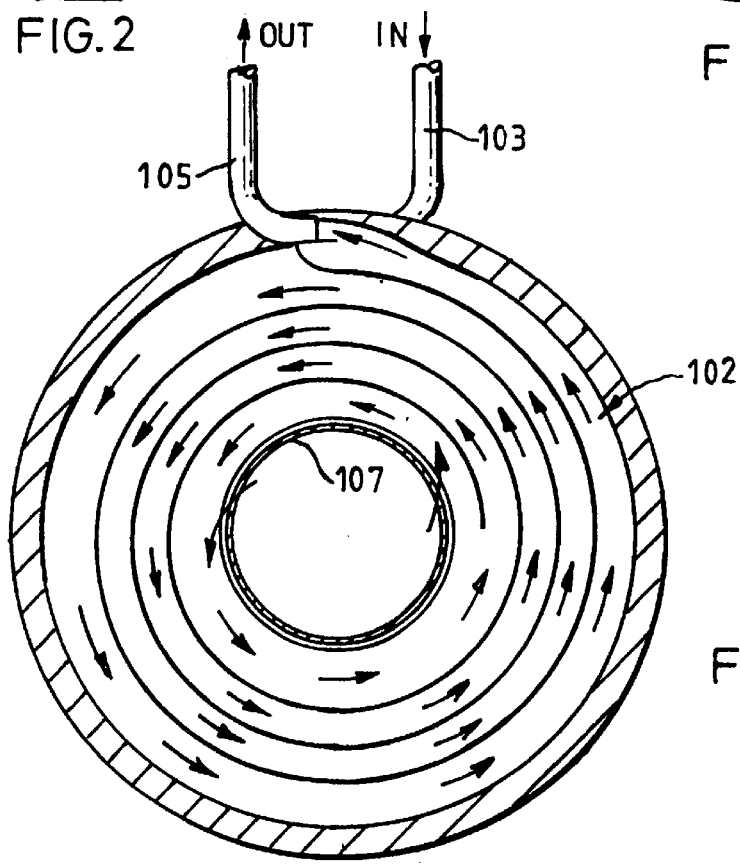

Referring in particular to FIGS. 2 and 3 of the drawings, in each of the passages 82, 84 between the stator windings, there is provided a coiled channel arrangement 100, 102 which is generally disc-shaped, as shown in FIGS. 3A and 3B of the drawings. The channel 100, 102 may, for example, comprise a plastic moulding, and may be formed integrally with one or both walls of the respective passage. Alternatively the channel may comprise a separate pipe disposed within the respective passage.

In the example shown, the stator assembly 80 comprises two passages 82, 84. Therefore, two respective coiled channel arrangements 100, 102 are in this case provided in each stator, the channel arrangements 100, 102 being mounted in the same plane as their respective stators.

As shown in FIG. 3A of the drawings, one end of the first coiled channel 100 provides an inlet 104 adjacent its periphery. The other end of the first channel 100 provides an outlet 106 adjacent the central opening 108 of the disc-shaped coiled channel arrangement 100.

Referring to FIG. 3B of the drawings the inlet 103 is provided adjacent the central opening 107 of the disc-shaped arrangement, and the outlet 105 is provided adjacent its periphery.

The outlet 100 of the first coiled channel arrangement 100 is connected to the inlet 103 of the second coiled channel arrangement.

In use, cooling liquid is forced into the first coiled channel arrangement 100 via the inlet 104 by means of a pump 110 (see FIG. 1). The liquid flows through the channel towards the central opening of the 108 of the first channel 100 and exits via the outlet 106. The liquid is then forced into the second coiled channel arrangement 102 through the inlet 103, and flows through the channel towards the periphery of the second channel 102. The liquid exits the second channel 102 via the outlet 105 and enters a fluid cooling system 112 (see FIG. 1) where it is cooled for re-use.

Figure 9A:
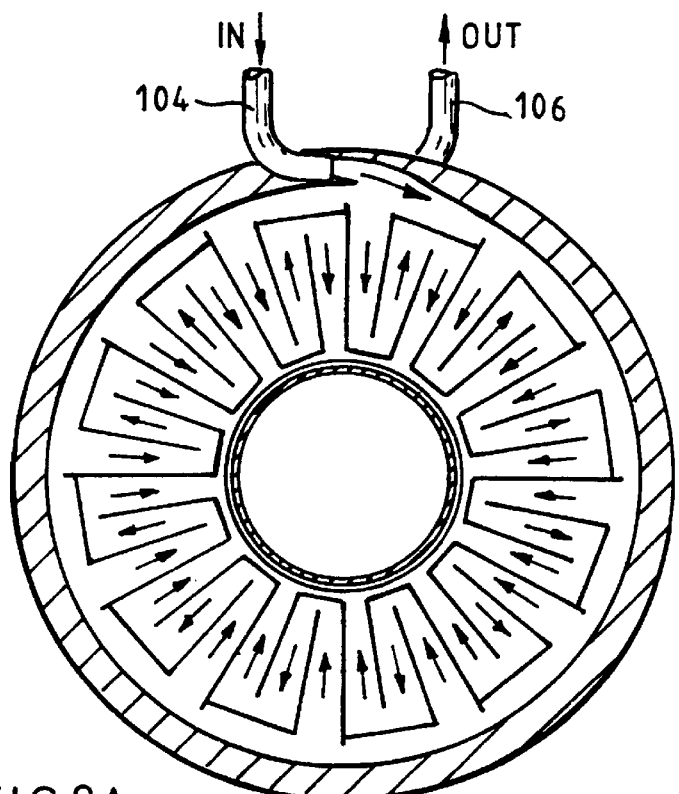
FIGS. 9A and 9B show cross-sections through a second embodiment of a stator for use in the axial field electrical machine shown in FIG. 1.
Figure 9B:
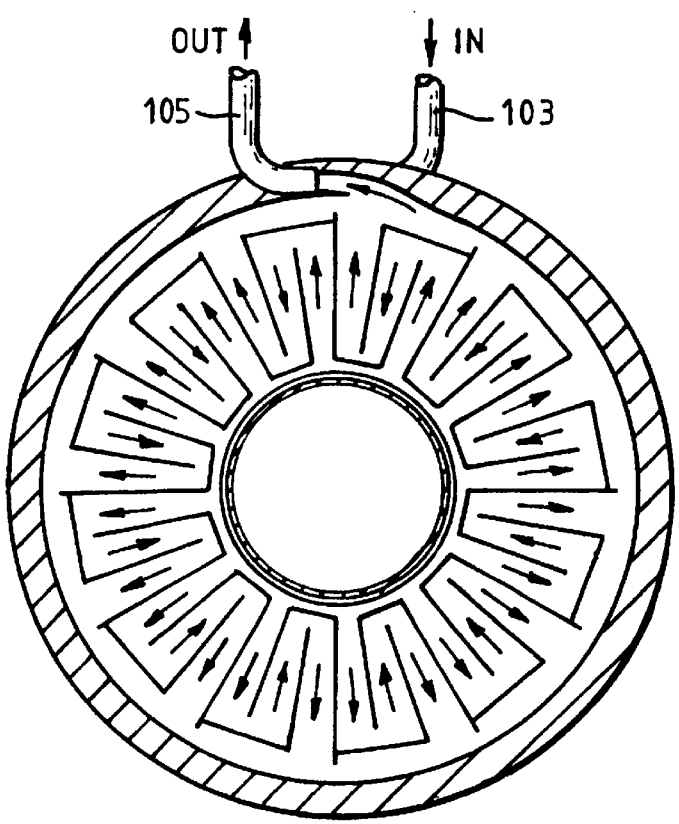
Figure 9C:
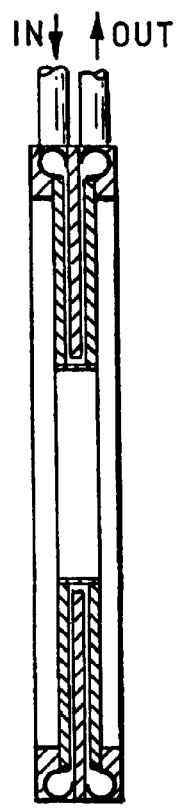
FIG. 9C shows an axial cross-section through the stator shown in FIGS. 9A and 9B.

Referring to FIGS. 9A and 9B of the drawings, in a second embodiment, the liquid cooling arrangement is such that liquid flows radially back and forth around the passages between the stator windings, as shown.

In use, cooling liquid enters the first passage 100 via inlet 104. The liquid flows radially back and forth around the passage, and exits via outlet 106. The liquid then enters the second passage 102 through the inlet 103, and flows radially back and forth, as before, until it has flowed substantially all of the way round the generally disc-shaped passage. The liquid exits the second passage 102 through outlet 105 and enters the fluid cooling system 112 (see FIG. 1) where it is cooled for re-use.

Figure 10A:
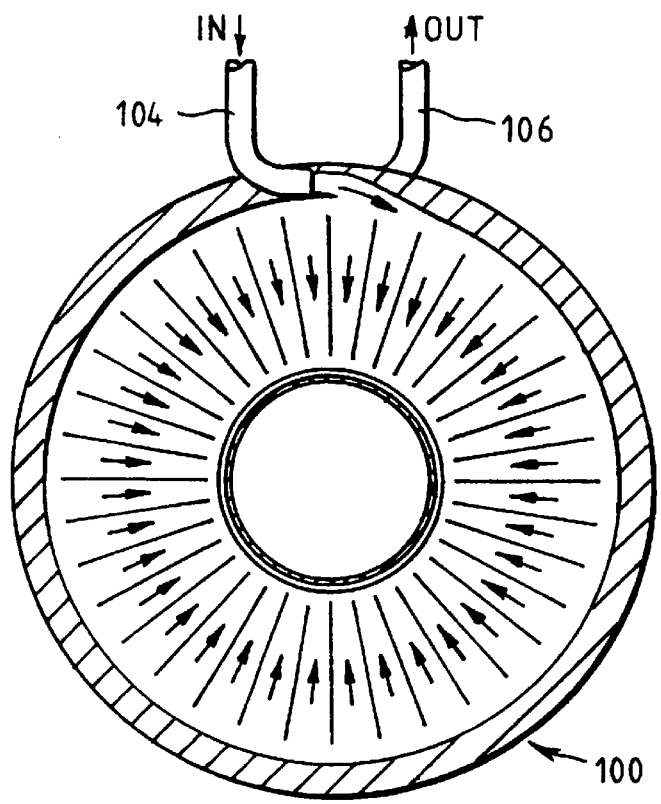
FIGS. 10A and 10B show cross-sections through a third embodiment of a stator for use in the axial field electrical machine shown in FIG. 1.
Figure 10B:
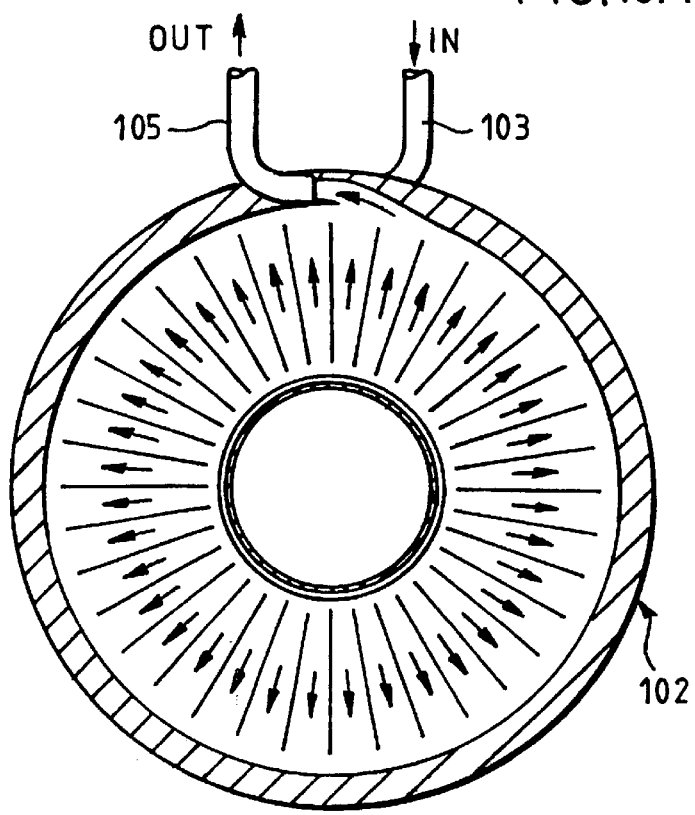
Figure 10C:
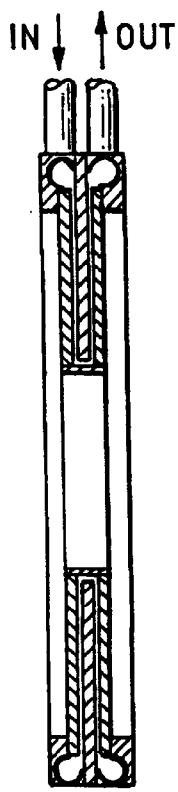
FIG. 10C shows an axial cross-section through the stator shown in FIGS. 10A and 10B.

Referring to FIGS. 10A and 10B of the drawings, in a third embodiment, the liquid cooling arrangement is such that liquid flows radially within each disc-shaped passage, as shown.

In use, cooling liquid enters the first passage 100 via inlet 104. The liquid flows radially from the periphery towards the centre of the passage 100, and exits via outlet 106. The liquid then enters the second passage 102 through the inlet 103, and flows radially from the centre to the periphery of the passage 102, and exits through outlet 105. The liquid then enters the fluid cooling system 112 (see FIG. 1) where it is cooled for re-use.

As shown in FIG. 1 of the drawings in all of the three embodiments described above, liquid enters the first passage or channel 100 of each stator stage in parallel via respective inlet pipes 120, and exits each stator stage in parallel via respective outlet pipes 130. Thus the temperature of coolant in each passage or channel 100, 102 should be substantially similar.

Referring to FIGS. 11, 12A and 12B of the drawings, in a third embodiment, the liquid cooling arrangement is such that the liquid flows in two radial passages or channels between the stator windings as shown.

In use, cooling liquid enters both of the passages 100, 102 via common inlet 104. The liquid flows towards a common outlet 100 at a position diametrically opposite the inlet 104, through channels in the configuration shown. The liquid exits both passages 100, 102 through the common outlet 106 and then enters the fluid cooling system 112 (see FIG. 1) where it is cooled for re-use.

The main advantage of the stator configuration shown in FIGS. 12A and 12B is that, because the liquid enters each of the passages between the stator windings through a common inlet and exits via a common outlet, this stator configuration would be suitable for use with any required number of passages, i.e. one or more.

Thus, as shown in FIGS. 13 and 14A, the same stator configuration would be suitable for use in a stator arrangement having only one passage 100.

Thus, liquid stator cooling is used to supplement or replace the air stator cooling system described above. This enables approximately 50% more power to be drawn from an electrical machine than is available from known machines of the same size or allow operation in which the passages normally occupied by the gas cooling are in vacuum. Therefore, a smaller machine can be provided which generates the same amount of power.

In accordance with the second aspect of the present invention, gas, for example, air, instead of liquid, is caused to flow in the passages 82, 84 between the stator windings. Any of the channel arrangements described above would be suitable for this aspect of the invention, although the configuration shown in FIGS. 12 and 14 is preferred. Of course, in this arrangement, the liquid cooling system 112 is omitted, instead, hot air is expelled and fresh air is drawn in.

In accordance with a third aspect of the present invention, whether gas or liquid flows in the passages between the stator windings, the gap between the stator stages and rotor stages may be under a vacuum.

In the light of this disclosure, modifications of the described embodiment, as well as other embodiments, all within the scope of the present invention as defined by appended claims, will now become apparent to persons skilled in the art.

What is claimed is:

1. A rotary electrical machine comprising at least one stator stage and at least one rotor stage, a space being provided between the stator stage and the rotor stage, and a generally central hollow core which communicates with said space between the stator and the rotor stages, the electrical machine further comprising first cooling means for cooling the stator stage by causing a first fluid to pass thereover, and second cooling means for causing a second cooling fluid to pass through the hollow core before entering the space between the stator and the rotor stages, characterized in that said first cooling means and said second cooling means are separate from each other such that said first cooling fluid and said second cooling fluid do not intermix with each other within the machine.

2. A rotary electrical machine according to claim 1 comprising at least two stator stages, wherein the first cooling means are arranged to cause the first cooling fluid to be supplied to each stator stage in parallel.

3. A rotary electrical machine according to claim 1, wherein the or each stator stage is provided with at least two stator windings defining a passage therebetween, and said first cooling means causes said first cooling fluid to pass through said passage.

4. A rotary electrical machine according to claim 3, wherein the or each stator stage is provided with three or more stator windings, a passage being provided between each adjacent winding, and said first cooling means causing said first cooling liquid to pass through each of said passages.

5. A rotary electrical machine according to claim 4 comprising a channel disposed in or formed integrally with each passage for conducting said first cooling fluid.

6. A rotary electrical machine according to claim 5, wherein the channel is arranged to conduct said first cooling fluid in substantially a radial plane of the respective stator stage.

7. A rotary electrical machine according to claim 5, wherein the or each channel comprises a pipe which is coiled to form a generally disc-shaped arrangement and which is disposed in or formed integrally with the or each passage.

8. A rotary electrical machine according to claim 7, wherein the or each pipe comprises a moulding of non-conducting or poorly electrically conducting material.

9. A rotary electrical machine according to claim 8, wherein the or each pipe comprises a plastic moulding.

10. A rotary electrical machine according to claim 5, wherein each channel is arranged to conduct said first cooling fluid radially within the passage.

11. A rotary electrical machine according to claim 10, wherein each channel is arranged to conduct said first cooling fluid radially back and forth within the passage.

12. A rotary electrical machine according claim 5, wherein an outlet of a channel disposed in one passage is coupled to an inlet of the channel disposed in an adjacent passage.

13. A rotary electrical machine according to claim 5, wherein the or each channel is arranged to conduct said first cooling fluid from a first position at a periphery of the passage to a second position which is substantially diametrically opposite said first position.

14. A rotary electrical machine according to claim 13, wherein a plurality of parallel channels conduct said first cooling fluid from said first position to said second position.

15. A rotary electrical machine according to claim 13, wherein the channel or channels disposed in each passage has a common inlet and a common outlet.

16. A rotary electrical machine according to claim 1, wherein said first cooling fluid is a liquid.

17. A rotary electrical machine according to claim 16, wherein said liquid is water.

18. A rotary electrical machine according to claim 16 wherein said liquid is oil.

19. A rotary electrical machine according to claim 1, wherein said first cooling means causes gas to pass over each stator stage.

20. A rotary electrical machine according to claim 19, wherein said gas is air.

21. A rotary electrical machine according to claim 19, wherein said gas is helium.

22. A rotary electrical machine according to claim 1 wherein said second cooling means causes cooling gas to pass through the hollow core before entering the space between the stator and rotor stages.

23. A rotary electrical machine according to claim 22, wherein said gas is air.

24. A rotary electrical machine according to claim 22, wherein said gas is helium.

25. A rotary electrical machine according to claim 1 comprising at least two rotor stages connected together by means of a coupling arrangement.

26. A rotary electrical machine according to claim 25, wherein the coupling arrangement comprises at least one air gap.

27. A rotary electrical machine comprising at least one generally disc-shaped stator stage having at least two phase windings defining a passage therebetween, and at least two generally disc-shaped rotor stages, the electrical machine further comprising cooling means for cooling the stator stage by causing a cooling liquid to pass said passage between said phase windings.

28. A rotary electrical machine according to claim 27 comprising at least two stator stages, wherein said cooling means are arranged to cause said cooling liquid to be supplied to each stator stage in parallel.

29. A rotary electrical machine according to claim 27, wherein the or each stator stage is provided with three or more stator windings, a passage being provided between each adjacent winding, and said cooling means causes said cooling liquid to pass through each of said passages.

30. A rotary electrical machine according to claim 29 comprising a channel disposed in or formed integrally with the or each passage for conducting said cooling liquid.

31. A rotary electrical machine according to claim 30, wherein the channel is arranged to conduct cooling liquid in substantially a radial plane of the respective stator stage.

32. A rotary electrical machine according to claim 30, wherein the or each channel comprises a pipe which is coiled to form a generally disc-shaped arrangement and which is disposed in or formed integrally with the or each passage.

33. A rotary electrical machine according to claim 32, wherein the or each pipe comprises a moulding of non-conducting or poorly electrically conducting material.

34. A rotary electrical machine according to claim 33, wherein the or each pipe comprises a plastic moulding.

35. A rotary electrical machine according to claim 30, wherein each channel is arranged to conduct said cooling liquid radially within the passage.

36. A rotary electrical machine according to claim 35, wherein each channel is arranged to conduct said cooling liquid radially back and forth within the passage.

37. A rotary electrical machine according to claim 30, wherein an outlet of a channel disposed in one passage is coupled with an inlet of the channel disposed in an adjacent passage.

38. A rotary electrical machine according to claim 30, wherein the or each channel is arranged to conduct said cooling liquid from a first position at a periphery of the passage to a second position which is substantially diametrically opposite said first position.

39. A rotary electrical machine according to claim 38, wherein a plurality of parallel channels conduct said cooling liquid from said first position to said second position.

40. A rotary electrical machine according to claim 38, wherein the channel or channels disposed in each passage has a common inlet and a common outlet.

41. A rotary electrical machine according to claim 27, wherein said cooling liquid is water.

42. A rotary electrical machine according to claim 27, wherein said cooling liquid is oil.

43. A rotary electrical machine according to claim 27, wherein a space is provided between the at least one stator stage and each of the at least two rotor stages, the machine comprising another cooling means for causing a cooling gas to pass through said space.

44. A rotary electrical machine according to claim 43 comprising a generally central hollow core which communicates with said space between the stator and the rotor stages.

45. A rotary electrical machine according to claim 44, wherein said another cooling means causes said cooling gas to pass through said hollow core before entering the space between the stator and the rotor stages.

46. A rotary electrical machine according to claim 43, wherein said gas is air.

47. A rotary electrical machine according to claim 43, wherein said gas is helium.

48. A rotary electrical machine according to claim 27, wherein a space is provided between the at least one stator stage and each of the at least two rotor stages, said space being under vacuum.

49. A rotary electrical machine according to claim 48 comprising at least two rotor stages connected together by means of a coupling arrangement.

50. A rotary electrical machine according to claim 49, wherein the coupling arrangement comprises at least one air gap.

51. A rotary electrical machine comprising at least one stator stage and at least one rotor stage, a space being provided between said stator stage and said at least one rotor stage, and a general central hollow core which communicates with the space between the stator stage and the rotor stage, the electrical machine further comprising cooling means for cooling the stator stage by causing said cooling fluid to pass thereover, and the space between the stator stage and the at least one rotor stage being under a vacuum.

* * * * *